United States Patent
Kuennen

(10) Patent No.: US 9,839,194 B2
(45) Date of Patent: Dec. 12, 2017

(54) EXHAUST AIR PURIFICATION DEVICE AND METHOD OF PURIFYING EXHAUST AIR IN A LIVESTOCK STABLE

(71) Applicant: BIG DUTCHMAN INTERNATIONAL GMBH, Vechta (DE)

(72) Inventor: Sven Kuennen, Holtinghausen (DE)

(73) Assignee: BIG DUTCHMAN INTERNATIONAL GmbH, Vechta (DE)

(*) Notice: Subject to any disclaimer, the term of this patent is extended or adjusted under 35 U.S.C. 154(b) by 287 days.

(21) Appl. No.: 14/680,448

(22) Filed: Apr. 7, 2015

(65) Prior Publication Data
US 2015/0282451 A1 Oct. 8, 2015

(30) Foreign Application Priority Data
Apr. 8, 2014 (DE) .................... 20 2014 002 982 U

(51) Int. Cl.
*B01D 53/14* (2006.01)
*A01K 1/00* (2006.01)
(Continued)

(52) U.S. Cl.
CPC .......... *A01K 1/0047* (2013.01); *B01D 46/002* (2013.01); *B01D 46/0056* (2013.01);
(Continued)

(58) Field of Classification Search
CPC ............ A01K 1/0047; F24F 2003/1617; F24F 3/1603; B01D 53/14; B01D 46/02;
(Continued)

(56) References Cited

U.S. PATENT DOCUMENTS 1,816,854 A * 8/1931 Jordahl .................. B01D 46/18
261/80
1,826,256 A * 10/1931 Richter .................. B01D 46/18
261/80

(Continued)

FOREIGN PATENT DOCUMENTS

DE 513 412 11/1931
DE 11 69 897 5/1964
(Continued)

OTHER PUBLICATIONS

German Patent Office, Search Report, Appln No. 20 2014 002 982.2, Big Dutchman International GmbH, (Oct. 17, 2014) (German language only).

*Primary Examiner* — Frank Lawrence
(74) *Attorney, Agent, or Firm* — Price Heneveld LLP

(57) ABSTRACT

The invention relates to an exhaust air purification device for a livestock stable comprising at least one exhaust air scrubber having a filter body that can be wetted with a scrubbing liquid or that can absorb a scrubbing liquid; and a scrubbing liquid container holding a scrubbing liquid; wherein the at least one exhaust air scrubber is arranged on a moving device, the moving device being designed and arranged to immerse the at least one exhaust air scrubber completely or partially into the scrubbing liquid in the scrubbing liquid container.

13 Claims, 6 Drawing Sheets

(51) Int. Cl.
  *B01D 46/00* (2006.01)
  *B01D 46/26* (2006.01)
  *B01D 47/14* (2006.01)
  *F24F 3/16* (2006.01)

(52) U.S. Cl.
  CPC ......... *B01D 46/0067* (2013.01); *B01D 46/26* (2013.01); *B01D 47/14* (2013.01); *B01D 53/14* (2013.01); *F24F 3/1603* (2013.01); *B01D 2258/06* (2013.01); *F24F 2003/1617* (2013.01)

(58) Field of Classification Search
  CPC ............ B01D 46/0056; B01D 46/0067; B01D 46/26; B01D 47/14
  USPC .... 261/80; 96/150, 268, 269, 274, 276, 281, 96/286–289, 291; 55/400
  See application file for complete search history.

(56) References Cited

U.S. PATENT DOCUMENTS

| | | | | |
|---|---|---|---|---|
| 1,836,131 | A | * 12/1931 | Richter | ............ B01D 46/18 55/353 |
| 2,511,295 | A | * 6/1950 | Roop | ............ B01D 46/20 261/80 |
| 2,864,598 | A | * 12/1958 | Arborgh | ............ B01D 46/18 261/80 |
| 3,907,967 | A | 9/1975 | Filss | |
| 4,762,539 | A | * 8/1988 | Muto | ............ B01D 47/18 261/92 |
| 2011/0185897 | A1 | 8/2011 | Wright et al. | |

FOREIGN PATENT DOCUMENTS

DE    20 2010 015 385    1/2011
FR         738 346       12/1932

\* cited by examiner

EXHAUST AIR PURIFICATION DEVICE AND METHOD OF PURIFYING EXHAUST AIR IN A LIVESTOCK STABLE

CROSS-REFERENCE TO FOREIGN PRIORITY APPLICATION

The present application claims priority to German Application 20 2014 002 982.2, filed Apr. 8, 2014, entitled "Exhaust Air Purification Device and Method of Purifying Exhaust Air in a Livestock Stable."

The invention relates to an exhaust air purification device for a livestock stable, comprising at least one exhaust air scrubber having a filter body that can be wetted with or absorb a scrubbing liquid.

The invention further relates to a method of purifying exhaust air in a livestock stable.

FIELD OF THE INVENTION

Exhaust air purification devices, like the one mentioned above, and corresponding methods of exhaust air purification, are used in stables that house livestock, for example pigs, chickens or cows, in order to purify the air vented or to be vented from the stable. In particular, such exhaust air purification devices are used to filter out particles and/or remove or reduce gaseous pollutants in the air, for example, ammonia contamination. Aside from ammonia, other malodorous substances and/or dust particles need to be filtered out from the air. While ammonia emissions are a limiting factor with regard to stable construction design especially in the vicinity of forests and other ecosystems, dust and odor emissions are especially important in the vicinity of residential areas. Exhaust air purification devices in particular serve the purpose of enabling farmers to plan new stable construction in areas with high emission exposure and/or low emission limits. However, due to small profit margins in livestock farming, exhaust air purification devices are also subject to strong cost pressure.

When using an exhaust air purification device, a stable generally has to have forced ventilation. The exhaust air purification devices usually have fans for this purpose, which suck in the stable air and then move it through the exhaust air purification devices.

Treatment and/or purification of the exhaust air usually does not take place in the area of the stable that houses the animals, but rather close to the area where the air is vented from the stable into the environment, which is why exhaust air purification methods are also referred to as so-called "end-of-pipe" technology. There are centralized and decentralized exhaust air purification devices. In centralized exhaust air purification devices, bundled exhaust air routing is required for all of the exhaust air. Stables with several compartments require an additional collector duct that transports the exhaust air to be cleaned to the exhaust air purification device. Decentralized systems, on the other hand, comprise several smaller units that are installed simultaneously in several different locations in the stable.

Existing methods of exhaust air purification for livestock applications are usually systems with different components for physical or wet-chemical separation that can also be combined in several stages. Physical procedures are used primarily for dust separation. There are various dry filters, like filter fleece, pocket filters or filter cartridges, for mechanical separation of the dust particles. However, the disadvantage of these dry filters is that they are hard to clean and can clog when they get very dirty.

Aside from dry separation, wet scrubbers are preferably used because they can filter especially dust and ammonia from the exhaust air. A wet scrubber usually comprises a scrubbing zone and a receptacle for a scrubbing liquid, and thus usually comprises two separate functions. The scrubbing liquid is generally supplied to the scrubbing zone via a feed pump. The scrubbing zone can be designed in the form of a spray nozzle or in the form of a sprinkled packed column. In the spray nozzle option, the required contact surface for the material transfer is generated with nozzles as a spray mist of the scrubbing liquid. High water pressure is required to ensure reliable operation without clogging. The spray nozzle option for the scrubbing liquid thus will result in higher energy costs for the pumps than the creation of a contact surface on a packed column, upon which the scrubbing liquid is then sprinkled. However, packed columns can get clogged and require automatic or manual cleaning from time to time. In addition, some areas of the packed column can dry up from time to time and, especially in the case of biological wet filters, thereby completely or partially lose their filter function. Complete and/or even wetting of the packed columns during sprinkling can currently only be ensured insufficiently or at a high cost and presents a great technical challenge.

SUMMARY OF THE INVENTION

The object of the present invention is therefore to present an exhaust air purification device for a livestock stable that will reduce or eliminate one or several of the aforementioned disadvantages. It is also the object of the present invention to present a corresponding improved method of purifying exhaust air in a livestock stable.

The invention solves the above-mentioned task with an exhaust air purification device for a livestock stable, comprising at least one exhaust air scrubber having a filter body that can be wetted with a scrubbing liquid and/or that can absorb a scrubbing liquid, and a scrubbing liquid container holding a scrubbing liquid, with the at least one exhaust air scrubber arranged on a moving device, which is designed and installed in such a way that the at least one exhaust air scrubber is completely or partially immersed in the scrubbing liquid in the scrubbing liquid container.

The exhaust air purification device according to the invention comprises at least one exhaust air scrubber with a filter body. This filter body usually has a large surface and can, for example, have packing columns, the surface of which can be wetted with a scrubbing liquid. The filter body can also be designed to absorb scrubbing liquid, for example with a honeycomb or sponge structure.

In addition, the exhaust air purification device comprises a scrubbing liquid container that holds the scrubbing liquid, which is used for wetting the filter body and/or for absorption by the filter body.

Contrary to prior art, the scrubbing liquid is not transported to or onto the filter body of the exhaust air scrubber by way of sprinkling or spray mist. Instead, the filter body of the at least one exhaust air scrubber is completely or partially immersed in or passed through the scrubbing liquid in the scrubbing liquid container. Thereby most of the filter body preferably comes into contact with the scrubbing liquid.

To this end, the at least one exhaust air scrubber is arranged on a moving device that is appropriately designed to move the exhaust air scrubber with filter body into the scrubbing liquid container in such a way that the filter body is completely or partially immersed in or passed through the scrubbing liquid. Preferably, the moving device then again removes the exhaust air scrubber with filter body from the scrubbing liquid. In addition, the immersing and removing of the at least one exhaust air scrubber with filter body should occur repeatedly, for example cyclically.

The exhaust air purification device, especially the exhaust air scrubber with filter body, is preferably arranged in the exhaust air flow channel. Preferably, a fan that transports the exhaust air through the exhaust air purification device is arranged upstream or downstream of the exhaust air scrubber, so that the exhaust air flows through the filter body of the exhaust air scrubber. The exhaust air purification device can in principle be operated as an over-pressure or under-pressure system; a fan or ventilator can especially be arranged upstream or downstream of the exhaust air scrubber.

The exhaust air purification device presented here has several advantages. Firstly, it does not require pumps for sprinkling or spraying of the scrubbing liquid, as they are known from prior-art exhaust air purification devices. Rather, in the exhaust air purification device according to the invention, the scrubbing liquid is made available in a scrubbing liquid container and the exhaust air scrubber with filter body is immersed in or passed through the scrubbing liquid, so that a sprinkling or spraying of the scrubbing liquid—and thus also the corresponding pumping action—is not required. In addition, a much better saturation of the filter body with the scrubbing liquid is achieved by immersing the filter body of the exhaust air scrubber in the scrubbing liquid or passing it through the scrubbing liquid than could be achieved by sprinkling or spraying of the scrubbing liquid. A thorough wetting or saturation of the filter body with the scrubbing liquid occurs especially if the filter body is completely or to a large degree immersed in or passed through the scrubbing liquid, and especially if the filter body is completely or partially immersed in or passed through the scrubbing liquid for a minimum retention period. This results in a considerably better wetting of the filter body as compared to existing systems.

In a preferred embodiment of the exhaust air purification device, two, three or several exhaust air scrubbers are arranged on the moving device and the moving device is designed and arranged in such a way that the exhaust air scrubbers are consecutively completely or partially immersed in the scrubbing liquid in the scrubbing liquid container.

The design with several exhaust air scrubbers is a modular configuration that enables a simple, fast and effective adjustment to different ventilation requirements, whereby different exhaust air purification capacities can be made available. The different exhaust air scrubbers are consecutively immersed in or passed through the scrubbing liquid in the scrubbing liquid container. This can result in a partial overlapping, where the first exhaust air scrubber and a second exhaust air scrubber are completely or partially immersed in the scrubbing liquid in the scrubbing liquid container, at least for a certain period of time.

In addition, an embodiment of the exhaust air purification device, where the moving device is designed and arranged in such a way that the exhaust air scrubber(s) is/are moved along a closed movement path, especially a circular, elliptical or racetrack-shaped movement path, is preferred. Furthermore, it is preferable that the movement path has at least two parallel movement path sections.

A closed movement path has the advantage that, in case of continuous operation of the exhaust air purification device, the moving device can maintain the operating direction and the exhaust air scrubbers can pass through the same positions along the closed movement path again and again. One section of the movement path is preferably arranged in the scrubbing liquid container in such a way that the exhaust air scrubbers are immersed in or passed through the scrubbing liquid in the scrubbing liquid container on their path along the closed movement path.

A racetrack-shaped movement path is, in particular, a movement path with two parallel straight movement path sections that are positioned opposite each other, and with two curved, preferably semicircular, movement sections that connect both ends of the parallel straight movement path sections.

It is further preferred that the moving device is designed and arranged in such a way that the exhaust air scrubber(s) is/are immersed in the scrubbing liquid downward in a vertical direction.

Preferably, one part of the movement path runs in a vertical direction above the scrubbing liquid container, and a further section of the movement path in the scrubbing liquid within the scrubbing liquid container. This preferably results in a vertical movement section to move the exhaust air scrubbers from the movement path section above the scrubbing liquid container to the movement path section within the scrubbing liquid container. Immersion in vertical direction must therefore be understood in such a way that the exhaust air scrubbers, during their movement into the scrubbing liquid in the scrubbing liquid container, carry out a movement that comprises a vertical movement section.

The section of the movement path, where the at least one exhaust air scrubber is completely or partially immersed in the scrubbing liquid, comprises a horizontal movement portion.

The section of the movement path, where at least one exhaust air scrubber is completely or partially immersed in the scrubbing liquid, preferably comprises a horizontal movement section. This means that the at least one exhaust air scrubber is not only immersed in the scrubbing liquid along a vertical movement path and then again removed from it, but that, in addition to such vertical movement section, there is preferably also a horizontal movement section during which the at least one exhaust air scrubber moves horizontally through the scrubbing liquid. Movement path sections where the at least one exhaust air scrubber is completely or partially immersed in the scrubbing liquid, which are curved and thus comprise horizontal and vertical movement sections, can be particularly preferred.

In a preferred embodiment, the moving device is designed in the form of a drum, roller, climb conveyor, elevator, conveyor belt or longitudinal conveying device.

The moving device can, for example, be designed as a drum or roller with the exhaust air scrubbers preferably arranged on the outer circumference of the drum or roller. The moving device can also be designed as a climb conveyor or elevator. A climb conveyor or elevator usually has a somewhat racetrack-shaped movement path with two, usually vertical, straight movement path sections that are connected in an upper and lower deflection section through an arch or semicircular movement section. Here, the exhaust air scrubbers are preferably arranged on the outer circumference of the climb conveyor or elevator. The exhaust air scrubbers can keep their alignment in the upper and/or lower deflection sections of the climb conveyor or elevator (in the sense of a continuous lift) or change their alignment in the upper and lower deflection sections. The lower deflection section of the moving device is preferably arranged in such a way that the exhaust air scrubbers, when passing the lower deflection section, are completely or partially, but preferably at least to a large degree, immersed in or passed through the scrubbing liquid in the scrubbing liquid container.

The exhaust air purification device can further preferably be designed in the form of a conveyor belt or a longitudinal conveying device. In this embodiment, several exhaust air scrubbers can preferably be immersed in the scrubbing liquid at the same time. The movement path should preferably also be designed in a racetrack-shape in this embodiment, i.e. with two straight, mainly horizontal, movement path sections and two curved or semicircular movement path sections in the outer deflection sections. In this embodiment, the exhaust air scrubbers that are preferably arranged on the outer circumference of the conveyor belt or longitudinal conveying device can keep their alignment or change their alignment in the deflection sections, with one of the two parallel straight movement path sections completely or partially immersed in the scrubbing liquid container. The lower run of such conveyor belt or longitudinal conveying device can also be separated into low-lying and less low-lying sections, with preferably only the low-lying section passing through the scrubbing liquid container.

It is further preferable that the moving device comprises a drive unit, preferably a rotary drive unit or ratchet drive unit, with such drive unit designed to drive the moving device into one operating direction.

The drive can, for example, be continuous or cyclical. The design should preferably be such that the drive of the moving device is implemented in such a way that the exhaust air scrubbers remain in the scrubbing liquid for a minimum retention period.

A rotational drive unit can, for example, rotate a moving device designed as a drum or roller around a longitudinal axis. Rotational drive units can, for example, also be arranged in one or both of the respective deflection sections of a climb conveyor, elevator, conveyor belt or longitudinal conveying device. The rotational drive unit can also be designed as a ratchet drive unit, which is a particularly simple and robust drive type. The operating direction should preferably be the direction in which the moving device is driven during the ongoing operating cycle of the exhaust air purification device.

In addition, an embodiment is preferred in which the flow direction of the exhaust air through the at least one exhaust air scrubber is in principle co-directional to the horizontal movement portion of the movement path of the at least one exhaust air scrubber through the scrubbing liquid when the moving device is driven in the operating direction.

In this embodiment, the exhaust air is channeled through the exhaust air scrubber in a flow direction that is opposite to the direction in which the exhaust air scrubber moves through the scrubbing liquid. The advantage of this embodiment is that the direction, in which the exhaust air flows through the exhaust air scrubber, is opposite to the direction in which the scrubbing liquid flows through the exhaust air scrubber (by moving the exhaust air scrubber through the scrubbing liquid in essentially the same flow direction as the exhaust air). This way, when moving the exhaust air scrubber through the scrubbing liquid, at least a partial cleaning of the exhaust air scrubber or the filter body can be achieved, since the scrubbing liquid flows through it in the opposite direction of the exhaust air. For example, dust particles that have accumulated on the raw-air side of the filter body can be washed out by the reverse flow-through of scrubbing liquid.

Alternatively or additionally, it can be preferred that the drive unit is designed to drive the moving device in a cleaning direction, with the cleaning direction being opposite of the operating direction.

In this embodiment, the moving device can be driven in two different directions. For example, it can be preferred to temporarily reverse the drive direction for cleaning of the exhaust air scrubbers. An alternating operation in the two different directions of the exhaust air purification device can also be advantageous.

Furthermore, an embodiment of an exhaust air purification device is preferred that is characterized by a housing with an air intake and air outlet and a flow path of exhaust air from the air intake to the air outlet, with the exhaust air scrubbers preferably being arranged on the moving device in such a way that the exhaust air along the flow path passes through at least one filter body.

The exhaust air purification device preferably has a closed-flow design in the sense that the exhaust air to be removed by the exhaust air purification device has to flow through at least one filter body of an exhaust air scrubber, thus ensuring that no unfiltered exhaust air can exit through the exhaust air purification device. The exhaust air scrubbers are thus preferably arranged directly adjacent to each other or connected via intermediate elements so that the exhaust air cannot bypass the exhaust air scrubbers and the packed columns on its way to the air outlet.

It is further preferred that the exhaust air scrubbers are arranged on the moving device in such a way that the exhaust air along the flow path has to pass through at least two filter bodies that are preferably not arranged next to each other along the movement path.

This embodiment provides for a two-stage exhaust air purification, i.e. the exhaust air has to flow through at least two filter bodies. While it is possible, as an alternative option, to arrange the air intake within the closed movement path, for example between two vertical straight movement path sections, and to channel the exhaust air from that point sideways through the two exhaust air units, which are moved along the vertical movement sections, to two lateral air outlets (which would correspond to a single-stage configuration), it is also possible to arrange a lateral air intake and also a lateral air outlet, whereby the exhaust air would then flow through the exhaust air scrubbers of both vertical movement path sections, in the sense of a two-stage configuration.

A further preferred embodiment provides that the scrubbing liquid container extends in a horizontal direction that is greater than or equal to the extension of the exhaust air scrubber(s) on the moving device in the same direction.

This embodiment provides that all exhaust air scrubbers in horizontal direction do not extend past the scrubbing liquid container. The advantage of this embodiment is that the scrubbing liquid coming from the scrubbing liquid containers can run off or drip downward and be re-absorbed by the scrubbing liquid container.

Another especially preferred embodiment is characterized by the fact that the at least one exhaust air scrubber comprises one, two or several scrubbing liquid reservoirs, which are arranged and designed in such a way that they can absorb scrubbing liquid from the scrubbing liquid container and preferably then release it in the direction of the filter body.

This embodiment provides that scrubbing liquid in the scrubbing liquid reservoirs of the exhaust air scrubber, which was absorbed during immersion, can in the subsequent process of the exhaust air scrubber be released to the filter body along the movement path. It is especially preferred that the scrubbing liquid reservoir is arranged vertically above the filter body. If a change of direction of the filter body is designed along the movement path, especially a reversal of the filter body, it can be especially preferred to provide two scrubbing liquid reservoirs, with the one arranged vertically above and one vertically below the filter body, so that even in case of a reversal of the alignment of the filter body or exhaust air scrubber, the other one of the two scrubbing liquid reservoirs is arranged vertically above the filter body. For example, the scrubbing liquid reservoir can be partially permeable in the direction of the filter body so that scrubbing liquid can drip from the scrubbing liquid reservoir in the direction of the filter body. The scrubbing liquid reservoir can also have openings or lines that are arranged or designed in such a way that scrubbing liquid is released from the scrubbing liquid reservoir in the direction of the filter body. This way a good wetting of the packed column can also be ensured during the time when the exhaust air scrubber is moving on the movement path outside of the scrubbing liquid range.

According to a further aspect of the invention, the initially mentioned object is achieved by an exhaust air scrubber in an exhaust air purification device for a livestock stable, especially a previously described exhaust air purification device, where the exhaust air scrubber is clearly characterized by the fact that the exhaust air scrubber comprises a filter body as well as one, two or several scrubbing liquid reservoirs that are arranged and designed in such a way that, upon immersion of the exhaust air scrubber in a scrubbing liquid container, they absorb scrubbing liquid from the scrubbing liquid container and preferably then release it in the direction of the filter body.

The exhaust air scrubber according to the invention and its possible further embodiments are characterized by features or method steps, which make them particularly suitable for use in an exhaust air purification device according to the invention and its further embodiments. Regarding the other advantages, embodiment versions and embodiment details of the exhaust air scrubber and its further embodiments, it is referred to the above description of the respective features of the exhaust air purification device.

According to a further aspect of the invention, the initially mentioned object is achieved by a method of exhaust air purification in a livestock stable, comprising the steps of providing a scrubbing liquid container holding a scrubbing liquid, providing at least one exhaust air scrubber comprising a filter body that can be wetted with and/or that can absorb a scrubbing liquid, and which is arranged on a moving device, and partially or completely immersing the at least one exhaust air scrubber in the scrubbing liquid in the scrubbing liquid container.

A preferred further embodiment of the method can be achieved through disinfection and/or cleaning of the at least one exhaust air scrubber by replacing the scrubbing liquid with a disinfecting liquid and/or cleaning liquid and complete or partial immersion of the at least one exhaust air scrubber in the disinfecting liquid and/or cleaning liquid in the scrubbing liquid container.

This further embodiment provides that the scrubbing liquid in the scrubbing liquid container is replaced by a disinfecting liquid and/or cleaning liquid or that disinfecting and/or cleaning additives are added. By subsequently immersing the at least one exhaust air scrubber, but preferably all exhaust air scrubbers, by driving the moving device similarly to the normal operation, the exhaust air purification device can be disinfected or cleaned in a simple, thorough and cost-effective manner. Thus, the only difference between disinfection and cleaning as compared to the ongoing operation of the exhaust air purification device is the fact that a different liquid is provided in the scrubbing liquid container.

Another further embodiment of the method can be achieved through cleaning the at least one exhaust air scrubber by driving the moving device in a cleaning direction that is opposite of the operating direction.

The method according to the invention and its further embodiments are characterized by features or method steps, which make them particularly suitable for use in an exhaust air purification device according to the invention and its further embodiments. Regarding the additional advantages, embodiment versions and embodiment details of this method and its further embodiments, it is referred to the above description of the corresponding device features.

BRIEF DESCRIPTION OF THE DRAWINGS

Preferred embodiments of the invention are described as examples based on the attached figures. The following is shown in.

DETAILED DESCRIPTION OF THE PREFERRED EMBODIMENTS

Figure 1:
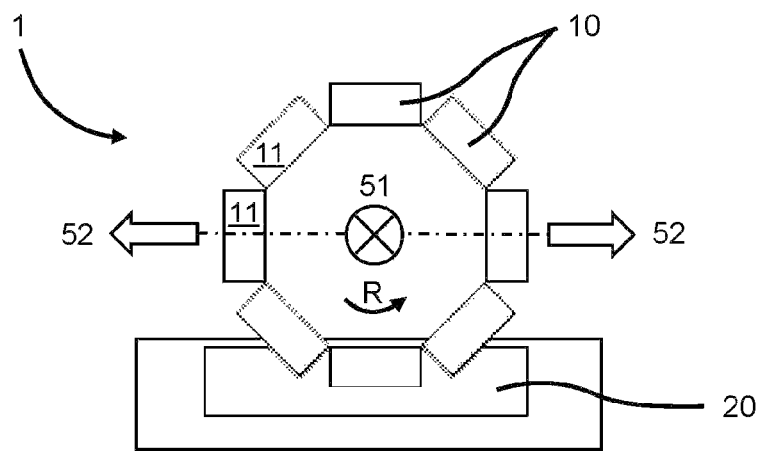
FIG. 1 is a side view of a schematic illustration of a first exemplary embodiment of an 15 exhaust air purification device according to the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
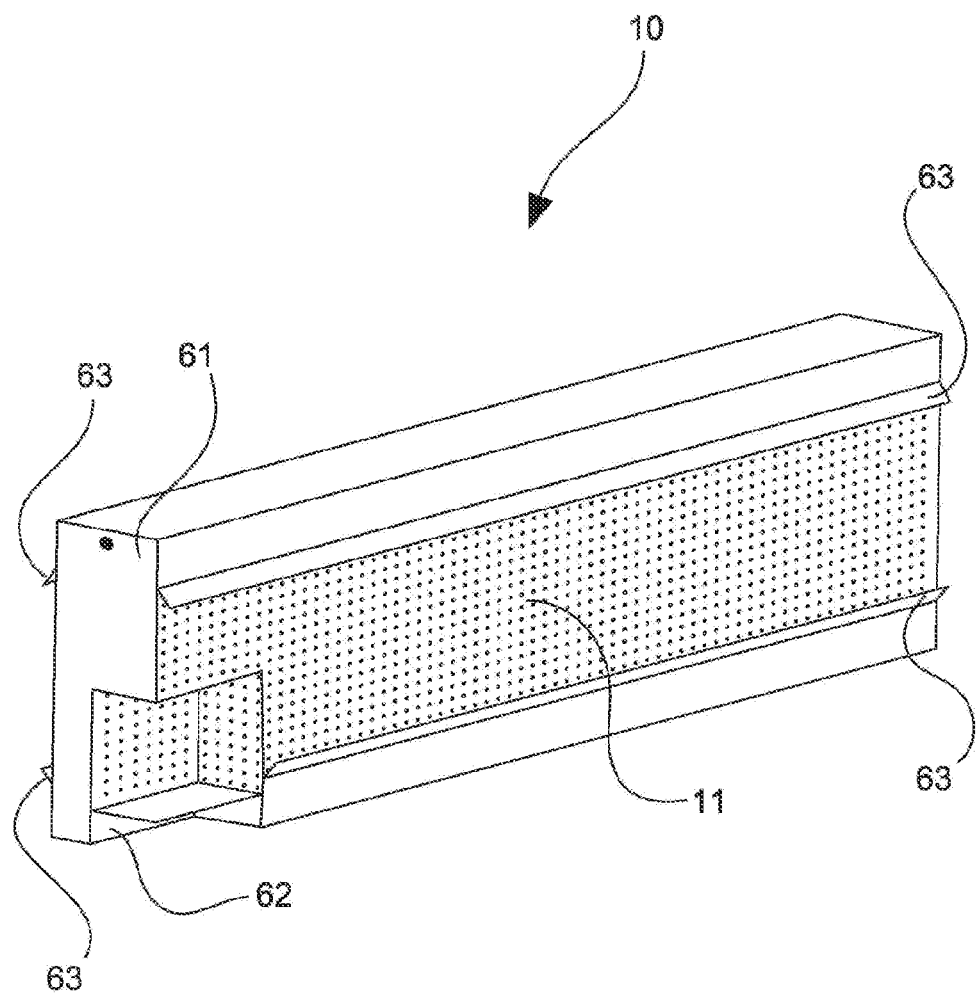
FIG. 6 is a three-dimensional perspective view of a schematic illustration of an exemplary embodiment of an exhaust air scrubber.
Figure 7:
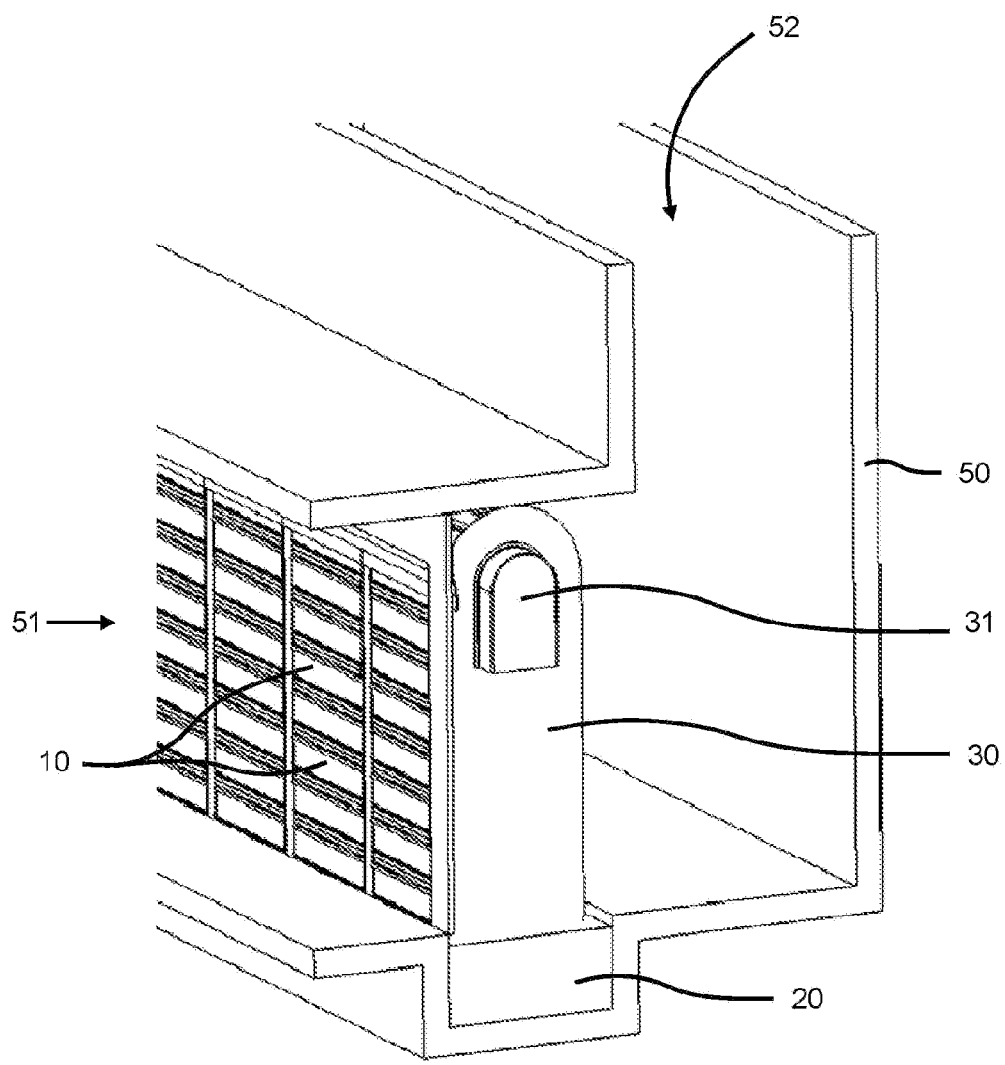
FIG. 7 is a three-dimensional perspective view of a schematic illustration of a further exemplary embodiment of an exhaust air purification device, similar to the one depicted in FIG. 5.

FIGS. 1 through 5 and 7 show different exemplary embodiments of exhaust air purification devices 1. FIG. 6 shows an exemplary embodiment of an exhaust air scrubber 10, which can be used in an exhaust air purification device 1. Elements that are identical or in principle have the same or similar functions are marked with the same reference numbers in the figures.

The exhaust air purification devices 1 of FIGS. 1 through 5 and 7 each comprise several exhaust air scrubbers 10, which in turn each comprise a filter body 11. The exhaust air scrubbers 10 are arranged on a moving device 30 (not shown for all embodiments). By driving the moving device 30 with a drive unit 31 (shown in FIG. 7), the exhaust air scrubbers 10 are moved along a movement path 40 (shown in FIG. 3). The driving of the moving device 30 occurs in an operating direction R.

The exhaust air purification devices 1 comprise a housing 50 (only shown in FIGS. 4, 5, and 7), through which exhaust air flows from an air intake 51 to an air outlet 52 along a flow path 53. The exhaust air purification devices 1 are designed in such a way that the exhaust air, on its flow path from the air intake 51 to the air outlet 52, must at least pass through the filter body 11 of an exhaust air scrubber 10.

The exhaust air purification device 1 shown in FIG. 1 comprises a single-stage design, in which two lateral air outlets 52 are provided starting from the center air intake 51. The exhaust air purification devices 1 shown in FIGS. 2 through 4 and 7 are designed or operated as two-stage exhaust air purification devices, whereby the exhaust air, on its path from the air intake 51 to the air outlet 52, has to flow through at least two exhaust air scrubbers 10 that are not arranged next to each other along the movement path 40.

Figure 2:
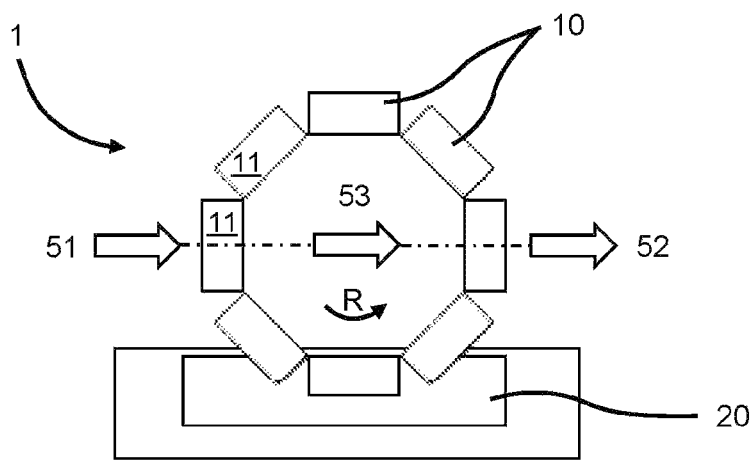
FIG. 2 is a side view of a schematic illustration of a second exemplary embodiment of an exhaust air purification device according to the invention.
Figure 3:
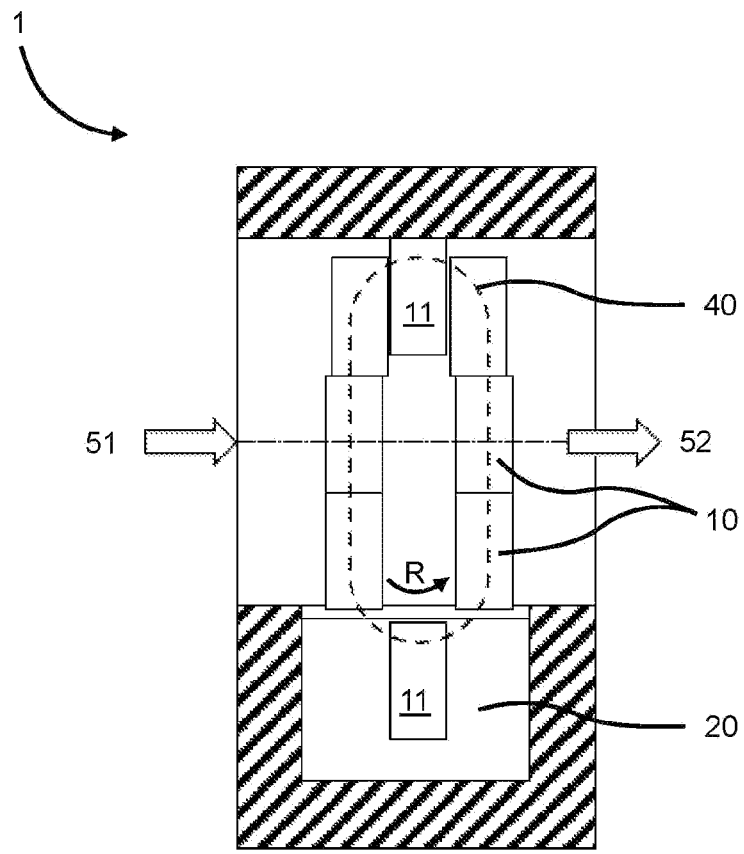
FIG. 3 is a side view of a schematic illustration of a third exemplary embodiment of an exhaust air purification device according to the invention.
Figure 4:
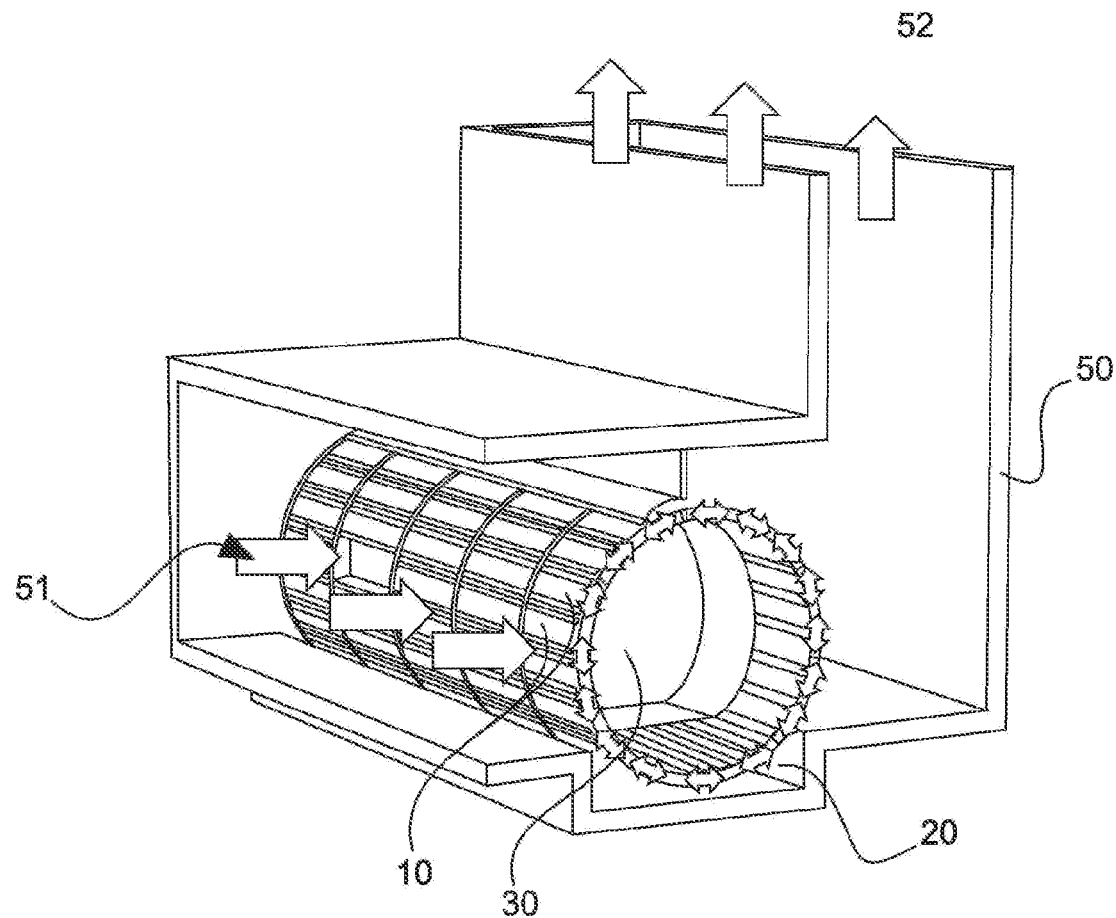
FIG. 4 is a three-dimensional perspective view of a schematic illustration of a further embodiment of an exhaust air purification device according to the invention, similar to the one depicted in FIG. 2.
Figure 5:
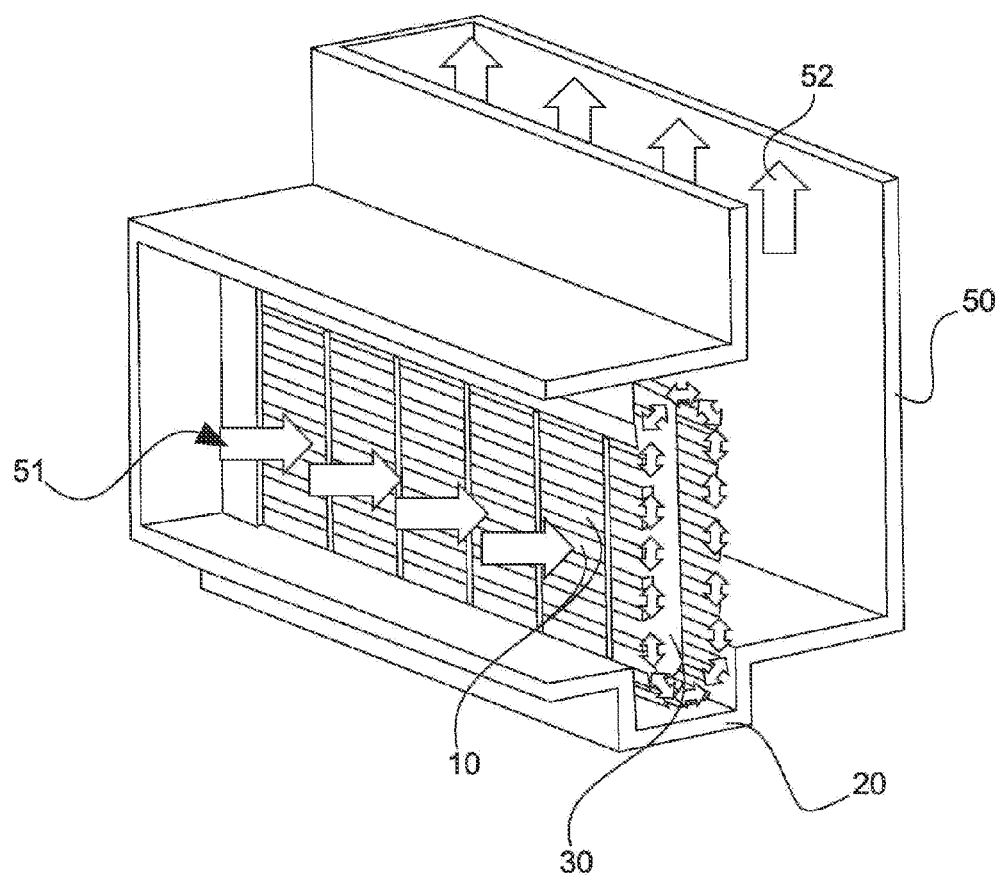
FIG. 5 is a three-dimensional perspective view of a schematic illustration of a further embodiment of an exhaust air purification device according to the invention, similar to the one depicted in FIG. 3.

The exhaust air purification devices 1 shown in FIGS. 1, 2, and 4, in principle, have a circular movement path 40, with the moving device 30 (see FIG. 4) being designed as, for example, a drum or roller. The exhaust air purification devices 1 shown in FIGS. 3, 5, and 7 comprise a moving device in the form of a climb conveyor or elevator and a racetrack-shaped movement path 40 with two straight, in principle vertical, parallel movement path sections and two curved, especially semicircular, movement path sections connecting both ends of the straight movement path sections.

All exhaust air purification devices 1 in FIGS. 1 through 5 and 7 comprise a scrubbing liquid container 20 holding a scrubbing liquid. The movement paths 40, along which the exhaust air scrubbers 10 are moved by the moving devices, provide that an exhaust air scrubber, which is preferably arranged in a lower section of the movement path 40, is immersed in or passed through the scrubbing liquid in the scrubbing liquid container 20. This way a complete, or at least very good, wetting of the filter bodies 11 can be achieved.

In the exhaust air purification device 1 shown in FIG. 4, the alignment of the exhaust air scrubbers 10 remains unchanged during their movement along the movement path 40 (in the sense of a continuous lift). In the exhaust air purification devices 1 shown in FIGS. 1 and 2, the alignment of the exhaust air scrubbers 10 is reversed halfway through the closed movement path 40.

In all exhaust air purification devices 1 in FIGS. 1 through 5 and 7, the extension of the exhaust air scrubbers 10 in a horizontal direction is not greater than that of the scrubbing liquid container 20. This ensures that the scrubbing liquid released from the exhaust air scrubbers 10 runs vertically downward back into the scrubbing liquid container 20.

FIG. 6 shows an exhaust air scrubber 10 with a filter body 11 that can be used in exhaust air purification devices 1, as shown, for example, in FIGS. 1 through 5 and 7. The exhaust air scrubber 10 shown in FIG. 6 is an especially preferred embodiment, in which a scrubbing liquid reservoir 61, 62 is arranged above and below the filter body 11. When immersing the exhaust air scrubber 10 in the scrubbing liquid of a scrubbing liquid container 20, not only is the filter body 11 wetted, but also the scrubbing liquid reservoirs 61 and 62 are filled. When the exhaust air scrubber 10 is then moved along the movement path outside of the scrubbing liquid range, water from the scrubbing liquid reservoirs 61 and 62 can then be used to further wet the filter body 11. In particular, the respective upper scrubbing liquid reservoir located in the corresponding section of the movement path can be designed to release, by way of gravity, the scrubbing liquid contained therein, for example through corresponding openings, downward in the direction of the filter body 11. Lateral slats 63 can be provided on the scrubbing water reservoirs to collect scrubbing liquid that runs downward. Especially if a reversal of the alignment of the exhaust air scrubbers 10 along the movement path is provided, the arrangement of a second scrubbing liquid reservoir is preferred, which can then, after reversal of the alignment of the exhaust air scrubber 10, become the upper scrubbing liquid reservoir that can release scrubbing liquid, by way of gravity, in the direction of the filter body 11. This will ensure a thorough saturation or wetting of the filter body 11 along the movement path of the exhaust air scrubbers 10 outside of the scrubbing liquid range.

The advantage of the depicted exemplary embodiments of the exhaust air purification device 1 and the exhaust air scrubber 10 is that they do not require pumps for transporting the scrubbing liquid, and that a very good saturation or wetting of the filter body of the exhaust air scrubbers occurs. Furthermore, this type of exhaust air purification device facilitates the cleaning or disinfection, because a simple replacement or modification of the liquid in the scrubbing liquid container and subsequent operation of the exhaust air purification device will ensure that the exhaust air scrubbers come into contact with the cleaning or disinfecting liquid in the scrubbing liquid container.

It is to be understood that variations and modifications can be made on the aforementioned structure and method without departing from the concepts of the present invention, and further it is to be understood that such concepts are intended to be covered by the following claims unless these claims by their language expressly state otherwise.

The invention claimed is:

1. An exhaust air purification device for a livestock stable comprising:
   at least one exhaust air scrubber having a filter body that can be wetted with a scrubbing liquid or that can absorb a scrubbing liquid; and
   a scrubbing liquid container holding a scrubbing liquid, wherein the at least one exhaust air scrubber is arranged on a moving device, the moving device being designed and arranged to immerse the at least one exhaust air scrubber completely or partially into the scrubbing liquid in the scrubbing liquid container,
   wherein the at least one exhaust air scrubber comprises a plurality of scrubbing liquid reservoirs that are arranged and designed in such a way that they absorb scrubbing liquid from the scrubbing liquid container and release the scrubbing liquid in the direction of the filter body.

2. An exhaust air purification device according claim 1, further comprising a plurality of exhaust air scrubbers arranged on a moving device, the moving device designed and arranged to immerse the exhaust air scrubbers completely or partially consecutively into the scrubbing liquid in the scrubbing liquid container.

3. An exhaust air purification device according to claim 1, wherein the moving device is designed and arranged to move the exhaust air scrubber along a closed movement path.

4. An exhaust air purification device according to claim 3, wherein the closed movement path includes any of a circular, elliptical, or racetrack-shaped movement path.

5. An exhaust air purification device according claim 1, wherein the moving device is designed and arranged to immerse the exhaust air scrubber downward into the scrubbing liquid in a vertical direction.

6. An exhaust air purification device according to claim 3, wherein the closed movement path includes a horizontal movement portion within which the at least one exhaust air scrubber is immersed in the scrubbing liquid.

7. An exhaust air purification device according to claim 1, wherein the moving device comprises any of a drum, roller, ascending conveyor, elevator, conveyor belt, or longitudinal conveying device.

8. An exhaust air purification device according to claim 1, wherein the moving device comprises a drive unit, wherein such drive unit is designed to drive the moving device in an operating direction.

9. An exhaust air purification device according to claim 8, wherein the drive unit comprises any of a rotary drive unit or ratchet drive unit.

10. An exhaust air purification device according to claim 6, wherein exhaust air flows through the exhaust air purification device in a flow direction, and the flow direction of the exhaust air through the at least one exhaust air scrubber is substantially co-directional to the horizontal movement portion of the movement path of the at least one exhaust air scrubber through the scrubbing liquid when the moving device is driven in an operating direction.

11. An exhaust air purification device according to claim 8, wherein the drive unit is designed to drive the moving device in either of the operating direction or a cleaning direction, with the cleaning direction being opposite of the operating direction.

12. An exhaust air purification device according to claim 1, further comprising a housing with an air intake and air outlet and a flow path of exhaust air from the air intake to the air outlet, wherein the exhaust air scrubbers are arranged on the moving device so that the exhaust air along the flow path passes through at least one filter body.

13. An exhaust air purification device according to claim 12, wherein the exhaust air scrubbers are arranged on the moving device so that the exhaust air along the flow path passes through at least two filter bodies that are not arranged next to each other along the movement path.

* * * * *